United States Patent
Schoenwald et al.

(10) Patent No.: US 11,050,262 B1
(45) Date of Patent: Jun. 29, 2021

(54) SYSTEMS AND METHODS FOR CONTROLLING ELECTRICAL GRID RESOURCES

(71) Applicants: National Technology & Engineering Solutions of Sandia, LLC, Albuquerque, NM (US); Montana Technological University, Butte, MT (US)

(72) Inventors: David A. Schoenwald, Albuquerque, NM (US); Raymond H. Byrne, Albuquerque, NM (US); Ryan Thomas Elliott, Seattle, WA (US); Jason C. Neely, Albuquerque, NM (US); Brian Joseph Pierre, Albuquerque, NM (US); Felipe Wilches-Bernal, Albuquerque, NM (US); Daniel J. Trudnowski, Butte, MT (US)

(73) Assignees: National Technology & Engineering Solutions of Sandia, LLC, Albuquerque, NM (US); Montana Technological University, Butte, MT (US)

(*) Notice: Subject to any disclaimer, the term of this patent is extended or adjusted under 35 U.S.C. 154(b) by 0 days.

(21) Appl. No.: 15/926,658

(22) Filed: Mar. 20, 2018

Related U.S. Application Data

(60) Provisional application No. 62/473,976, filed on Mar. 20, 2017.

(51) Int. Cl.
*H02J 3/44* (2006.01)
*H02J 3/26* (2006.01)
*H02J 3/32* (2006.01)

(52) U.S. Cl.
CPC ........ *H02J 3/44* (2013.01); *H02J 3/26* (2013.01); *H02J 3/32* (2013.01)

(58) Field of Classification Search
CPC .......... H02J 3/44; H02J 3/32; H02J 3/26
USPC ............................................. 700/297
See application file for complete search history.

(56) References Cited

U.S. PATENT DOCUMENTS

| | | | | |
|---|---|---|---|---|
| 8,340,931 | B2 * | 12/2012 | Dickens | H02J 3/24 702/60 |
| 9,077,200 | B2 * | 7/2015 | Majumder | H02J 3/24 |
| 9,766,991 | B1 * | 9/2017 | Katz | H04L 67/101 |
| 10,027,119 | B2 * | 7/2018 | Wells | H02J 3/18 |
| 2010/0023179 | A1 * | 1/2010 | Korba | H02J 3/24 700/297 |
| 2010/0152910 | A1 * | 6/2010 | Taft | G01D 4/002 700/286 |
| 2014/0159658 | A1 * | 6/2014 | Kiceniuk, Jr. | B60L 11/1816 320/109 |
| 2016/0334447 | A1 * | 11/2016 | Parashar | G01R 25/00 |
| 2018/0314769 | A1 * | 11/2018 | Chiang | G06F 17/504 |

FOREIGN PATENT DOCUMENTS

WO   WO 2011/150247   * 12/2011

* cited by examiner

*Primary Examiner* — Chun Cao
(74) *Attorney, Agent, or Firm* — Daniel J. Jenkins

(57) ABSTRACT

The present invention relates to PMU-based control systems for dampening inter-area oscillations in large-scale interconnected power systems or grids to protect against a catastrophic blackout. The control systems receive phasor measurements from two or more locations on an AC transmission line and generates a power control command to a power resource on the grid.

13 Claims, 2 Drawing Sheets

SYSTEMS AND METHODS FOR CONTROLLING ELECTRICAL GRID RESOURCES

CROSS-REFERENCE TO RELATED APPLICATIONS

This application claims priority to U.S. Provisional Patent Application Ser. No. 62/473,976, entitled "SYSTEMS AND METHODS FOR ACTIVE DAMPING CONTROL OF INTER-AREA OSCILLATIONS IN LARGE-SCALE INTERCONNECTED POWER SYSTEMS," by Schoenwald et al., filed Mar. 20, 2017, the disclosure of which is incorporated herein by reference in its entirety.

STATEMENT OF GOVERNMENT INTEREST

The United States Government has rights in this invention pursuant to Contract No. DE-AC04-94AL85000 between the United States Department of Energy and Sandia Corporation, and pursuant to Contract No. DE-NA0003525 between the United. State Department of Energy and National Technology and Engineering Solutions of Sandia, LLC, for the operation of the Sandia National Laboratories.

FIELD

The present disclosure is generally directed to electrical transmission system stabilization, and more particularly to control systems and methods for damping inter-area oscillations using modulation of real power at strategically located points in a grid in response to real-time Phasor Measurement Unit (PMU) feedback.

BACKGROUND

A major goal in transmission system power transfer is to mitigate inter-area oscillations that can disrupt operations and lead to cascading failures. These oscillations which disrupt the grid can result from an energy provider unexpectedly tripping offline or being brought online without coordination, or from instabilities caused by grid operators attempting to transmit too much power over transmission lines, for example. Large power system blackouts, although infrequent, may impact tens of millions of people and result in direct costs up to several billion dollars. There are also indirect costs such as possible social disruptions and the propagation of failures into other infrastructures such as communication, water supply, natural gas, and transportation systems. The vital importance of electric power to our society motivates continued attention to maintaining power system stability and developing effective self-healing control strategies to prevent blackouts under major disturbances, both natural and man-made.

Historically, major blackout events started with failures of individual transmission components in a power system. Those failures contributed to additional failures because of the interdependencies among components in the grid. The first few failures were mainly caused by unanticipated disturbance events (e.g. transmission line outages due to severe weather conditions or overload); thus, some transmission components became out-of-service thereafter, and as a result, overloads occurred on remaining operational transmission components. This propagation of overloads generated more overloads such that the failures cascaded and spread to a much wider area of the grid. The cascading failures gradually weakened the connection of the power system and caused unintentional system separation and severe stability problems leading to a large-area blackout.

In recent years, efforts have been made to mitigate cascading failures in order to prevent blackouts. Traditionally, damping of inter-area oscillations is carried out by attaching local controllers to the generating units that have the greatest controllability of the mode. Power system stabilizers (PSSs) are the most widely used type of (local) controller deployed towards that end. In addition to PSSs, other power system components can be used to provide damping to inter-area modes, such as Thyristor-controller Series Compensators (TCSCs), Static Var Compensators (SVCS) and energy storage.

The damping of these oscillations using system-wide information has also been investigated through Wide Area Damping Control (WADC) schemes using different power system components as actuators for these control strategies. PSSs with remote signals and WADC using wind generators have also been investigated. Because power systems subject to inter-area power swings cover large geographic areas, the use of systemwide information requires robust communication networks. Even if the communication channels used for transmitting the information needed for the wide-area control strategy are completely reliable, the information being transmitted can still be subject to high communication latencies.

In 1996, the Western Interconnection (the western North American power grid) experienced a catastrophic system breakup and widespread outage that was primarily a result of poorly damped inter-area oscillations that had built up over highly congested north-south transmission paths. When cascading failures occur, it is difficult for system operators at control centers to take corrective actions in a matter of a few minutes or even seconds thus, automatic protection and control schemes are required in preventing, slowing, or mitigating cascading failures. These automatic schemes need to be able to strategically coordinate local protection actions at the system level in order to stop the spread of cascading failures effectively. However, protecting interconnected power systems against cascading failures and the stability/oscillation problems incurred poses a challenge to power system engineers because power systems in the real world are often huge and complex while the time for online computations and decision making for control actions is quite limited.

One of the most severe stability problems that may occur with the spread of cascading failures is a loss of synchronism. When cascading failures continuously weaken the power system and impact the connections between interconnected sub-systems or control areas, inter-area oscillations will become poorly damped and grow in amplitude. If damping worsens, these oscillations can lead to angle separation between two or more groups of generators creating a loss of synchronism, which can then result in generation outages and loss of transmission capacity. In an unpredictable way, the system may collapse and separate into isolated electrical islands.

Because the formation of these islands is not going to occur in a designed manner, it is unavoidable that problems such as having (1) large imbalances between generation and load will exist in some islands (Excessive load in a load-rich island has to be shed timely to prevent rapid frequency declines of generators while excessive generation has to be rejected in a generation-rich island. Consequently, large-area power outages can result from these unplanned island formations); (2) some transmission lines become overloaded and then tripped possibly resulting in more failures and further system separation within islands; and (3) the possibility of the generators that tend to lose synchronism in one island formed, making it difficult for them to cooperate with each other spontaneously which could lead to further outages of generators or transmission assets, and even worse, separation may continue in that island.

The above shows that unintentional system separation may not stop cascading failures. In contrast, it may worsen the situation and lead to large-area blackouts.

The need remains, therefore, for systems and methods that dampen transmission oscillations that can cause a failure of the transmission system.

SUMMARY OF THE DISCLOSURE

The present invention is directed to systems and methods that provide active damping of inter-area oscillations in large-scale interconnected power systems. To damp oscillations in a transmission grid, a damping controller modulates (introduces or removes) power from an energy resource(s) on the grid in response to real-time Phasor Measurement Unit (PMU) measurements taken from two or more locations in the grid.

According to an embodiment of the disclosure, a controller is disclosed that includes a real-time control module that receives two or more phasor measurement unit measurements taken from two or more corresponding locations on an AC power transmission line. The controller is configured to generate one or more power commands to an energy resource in response to the two or more phasor measurement unit measurements. In a distributed control architecture, such as would be the case with multiple energy storage locations, each storage device would get a separate power command. Multiple energy resources would similarly receive corresponding commands.

According to another embodiment of the disclosure, a damping controller system is disclosed that includes two or more phasor measurement unit measurements located at two or more corresponding locations on an AC power transmission grid and a controller that receives two or more phasor measurement unit voltage magnitude and phase angle measurements from the corresponding two or more phasor measurement units. The controller is configured to generate one or more power commands to an energy resource in response to the two or more phasor measurement unit measurements.

According to another embodiment of the disclosure, a method of damping oscillations in an electrical transmission grid is disclosed that includes taking two or more phase angle measurements at two or more corresponding locations on an AC transmission grid, determining one or more power commands from the two or more phase angle measurements, sending the one or more power commands to an energy resource, and adjusting power from the energy resource to the electrical transmission grid in response to the command to damp these oscillations by counter-acting their growth in magnitude.

One advantage of this disclosure is to provide an additional contingency for a highly stressed grid.

Another advantage of the disclosure is to allow higher power flows over transmission lines since stability limits can be increased to be closer to thermal limits, thereby increasing potential revenue.

Another advantage of the present disclosure is to improve overall grid reliability.

Another advantage is the avoidance of a catastrophic system breakup and widespread outages as in the August 1996 Western Interconnection (WI) breakup.

Another advantage is the reduction and/or postponement of the need to increase transmission capacity through capital construction.

Another advantage is the potential to safely increase power transfer limits through congested transmission corridors. The damping controller can achieve this by enabling the current power transfer limits, which are constrained by stability concerns to be much closer to the thermal ratings of existing transmission lines.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

Wherever possible, the same reference numbers will be used throughout the drawings to represent the same parts.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

The present invention is directed to systems and methods that provide active damping of inter-area oscillations in a large-scale interconnected power system or electrical grid (grid). The active damping dampens oscillations in a transmission line in a grid by using a damping control to modulate (introduces or removes) power from an energy or power asset or resource on the grid in response to real-time Phasor Measurement Unit (PMU) measurements taken from two or more locations in the transmission grid of the grid.

The grid may be a national, regional, or local grid. In an embodiment, the grid may be a regional grid including multiple high voltage DC transmission lines in the 500 kV-750 kV range and AC transmission lines in the 230 kV-500 kV range, power generators or sources (power plants), and loads (cities and industries). For example, the regional grid may be the North American Western Interconnection, and the transmission lines may include the California-Oregon Intertie (COI).

The energy or power asset or resource may be a power generator, transmission resource, and/or load. The power resource may add, remove and/or adjust power supply and/or load to the grid. In an embodiment, a power resource may be a power generator that may add power to the grid by coming online. The power generator may be, but is not limited to carbon fuel power generation plants, wind farms, wave energy farms, nuclear power facilities, solar power generation facilities, battery energy storage facilities, and pumped hydroelectric facilities. The power provider may be a power carrier that can provide power to the grid, such as the Sylmar DC to AC converter facility in Southern California.

In another embodiment, a power resource may be a load that could add power to the grid by going off-line or reducing load. In another embodiment, the load may be an energy storage unit that can remove power (create or increase a load) by charging the energy storage unit. In another embodiment, energy storage and load modulation systems may be able to provide bi-directional modulation. In another embodiment, smart inverters PV systems) may be used to add power to the system.

Phasor Measurement Unit (PMU) measurements are devices that give very accurate measurements of voltage magnitude and phase angle on the grid wherever they are installed. These measurements are GPS time stamped giving the user the precise time the measurement was taken regardless of how long it took the measurement to arrive at the user.

Figure 1:
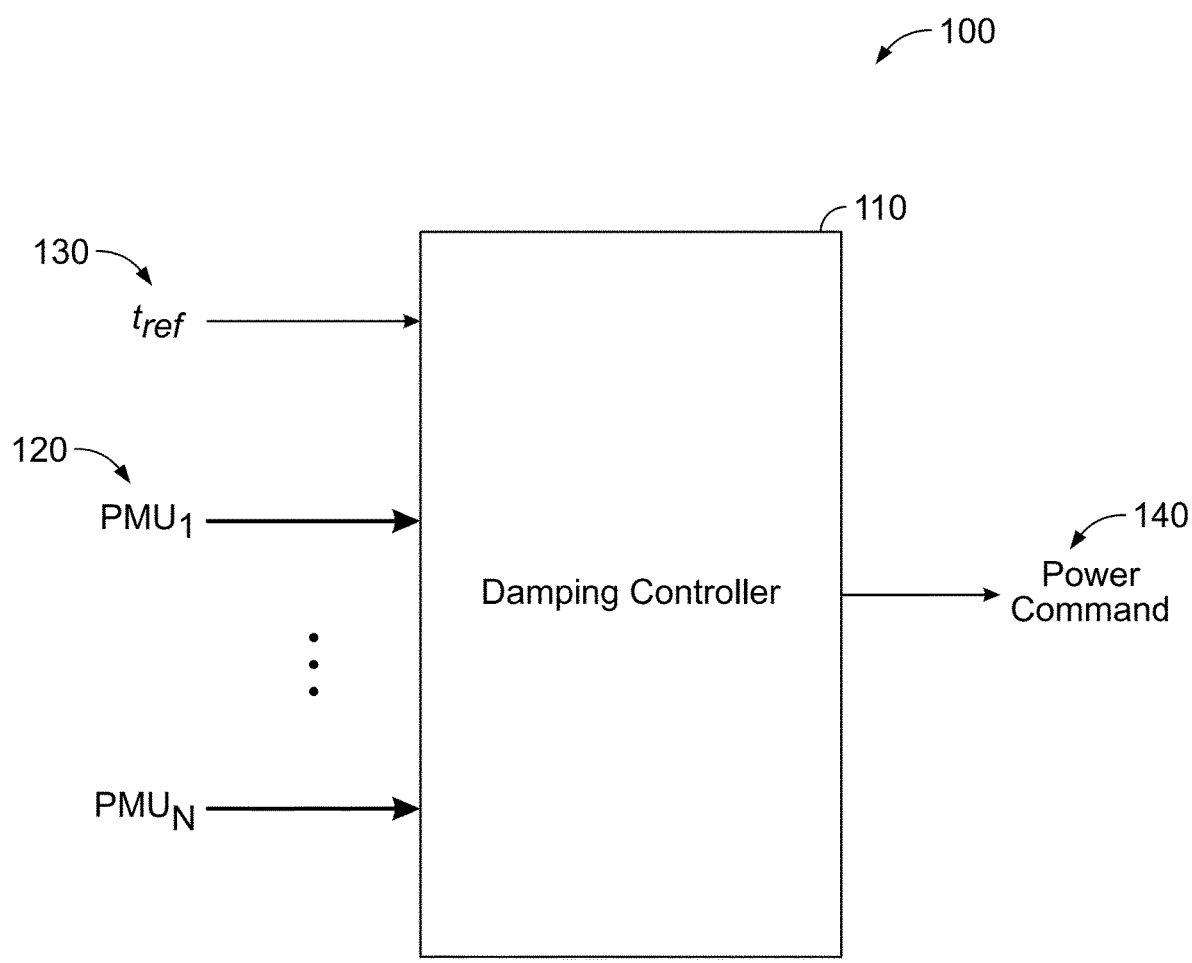
FIG. 1 is an illustration of a control system according to an embodiment of the invention.

FIG. 1 is a high level illustration of a damping control system 100 according to an embodiment of the invention. As can be seen in FIG. 1, the damping control system 100 includes a damping controller 110, n number of PMU inputs 120, a time reference input 130, and a power adjustment output signal 140. The control system 100 receives PMU measurements from 1 to n from measurement points located throughout a transmission grid. In an embodiment, the measurements may be taken along a specific transmission path. The PMU data consists of three-phase voltage measurements including magnitude and phase angle values. In an embodiment, the transmission line may be part of a wide-area power grid. In an embodiment, the number of PMU measurement sites may be determined so as to assure oscillation detection over the transmission grid. In an embodiment, the number of sites may be up to 400 sites. In another embodiment, the number of PMU measurement units may be up to 100 sites. It should be noted that the control system may only receive data from a subset of sites monitoring oscillations.

The control system 100 also receives a reference time $t_{ref}$ from a GPS system (not shown). The reference time $t_{ref}$ allows the control system to determine the delays between the time the measurements were taken and the time they arrived at the controller—if too long (greater than some threshold, typically 100 ms or so) then the data is not used.

The control system 100 outputs one or more modulation or power adjustment commands to a power resource connected to the grid. The power adjustment is a command to increase or decrease power to the power resource at the point or location it is connected to the transmission grid. For example, the power resource may be a power generator, power load, energy storage, or a DC to AC power converter facility that adds power to an AC transmission line from a DC transmission line power resource.

The power adjustment command directs a power resource to add or reduce power to the portion of the transmission grid experiencing oscillations. As understood, power may be added by reducing a load. For example, for a transmission line designated North-to-South (N-S) for the flow of power from north to south endpoints, the power resource will be directed to add power to the power flow from N-S when the electrical frequency is lower in the South than in the North (indicating an excess of load to available generation in the South). Likewise, the power adjustment could be reducing the power flow from N-S when the electrical frequency is lower in the North than in the South (indicating an excess of load to available generation in the North. Similarly, for South-to-North (S-N) transmission Where net power flow is from S-N, the power adjustment reduces (adds) to the power flow from S-N when the electrical frequency is lower (higher) in the South than in the North.

Figure 2:
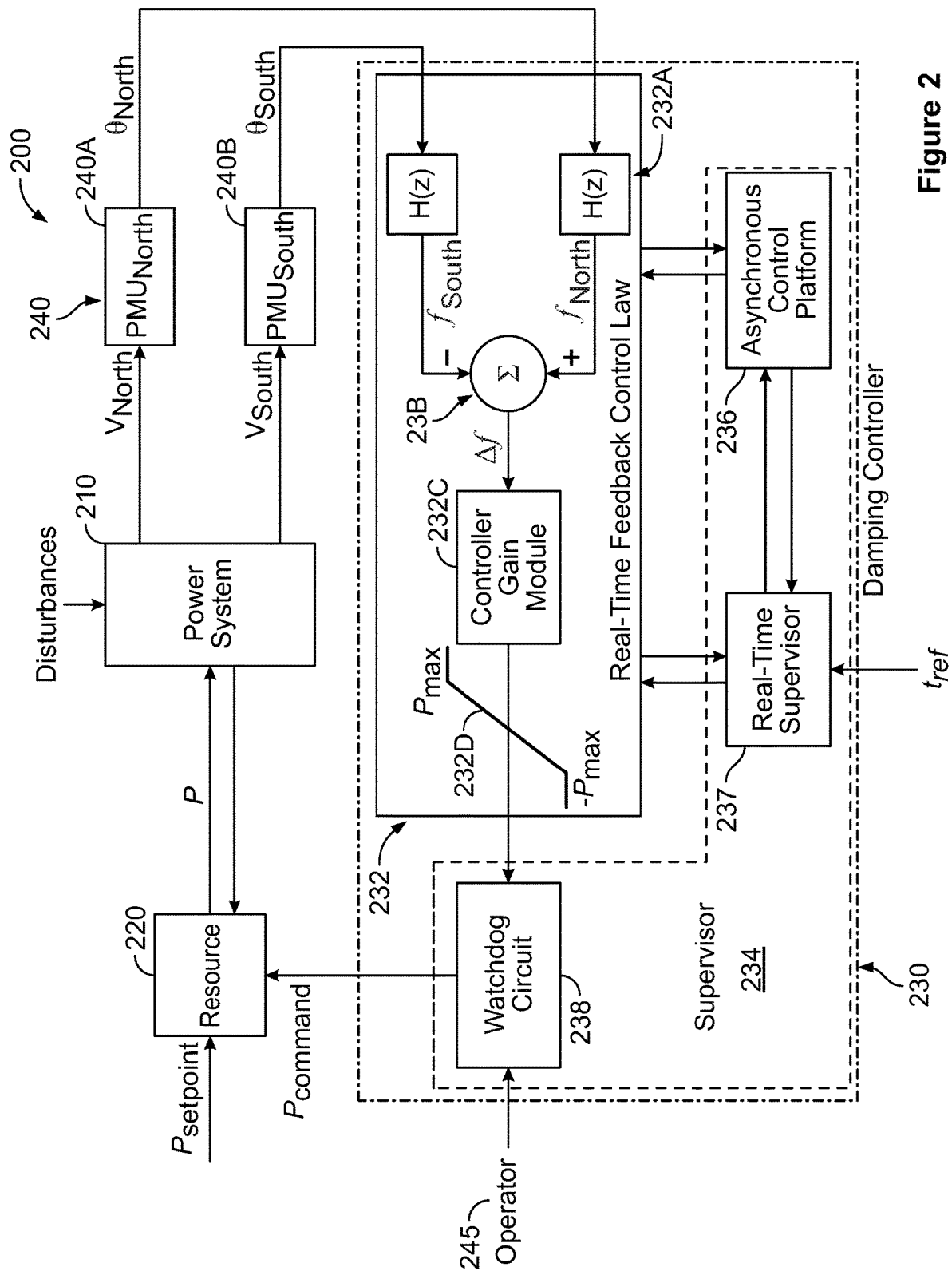
FIG. 2 is a block diagram of a damping controller system according to an embodiment of the disclosure.

FIG. 2 illustrates a block diagram of a damping controller system 200 according to an embodiment of the disclosure. The damping controller system 200 monitors a power system or electrical grid (grid) 210 for oscillations in power transmitted over an AC transmission grid (not shown) within the grid 210 and provides power level or commands to one or more energy or power assets or resources 220 to damp oscillations in the power transmission, thereby stabilizing power transmission. As used herein, to damp oscillations is to reduce the amplitude in oscillations. The damping controller system 200 includes a damping controller 230 and Phasor Measurement Units (PMUs) 240.

In an embodiment, the grid 210 is an electrical power grid including an AC power transmission grid including one or more AC power transmission lines (AC transmission lines) that may experience oscillations. The grid 210 may be a national, regional, or local power grid including power generators, power loads, and a power transmission grid including one or more power transmission lines. The grid is discussed in more general detail above. In an embodiment, the grid 210 may be a regional grid including multiple high voltage DC transmission lines in the 500 kV-750 kV range and AC transmission lines in the 230 kV 500 kV range, power generators or sources (power plants), and loads (cities and industries).

The grid 210 may experience a disturbance 212 that causes an oscillation in a transmission line in the grid 210. The disturbance may be from generator governors, such as valves in hydro plants, tripped lines, generator units going off-line (planned or unplanned, sudden load increases/decreases, geomagnetic disturbances (earthquakes, sunspots activity, EMP activity, etc.) that cause forced oscillations.

In this exemplary embodiment, the damping controller system 200 includes two PMUs 240, $PMU_{north}$ 240A and $PMU_{south}$ 2403 that monitor an AC transmission line (within the grid, not shown) to detect indications of oscillations. These PMUs monitor at the terminus of the transmission line, respectively. In this example, they are indicated as the north and south terminus. In another embodiment, two more PMUs may monitor an AC transmission line, and one or more transmission lines may be monitored. Each PMU monitors one transmission line at a time, and two or more PMUs monitor a transmission line for oscillations, as comparing monitored data from separate locations is necessary to determine if an oscillation is present. For example, two or more PMUs may be used to monitor a transmission lines in a transmission grid so as to provide more accurate oscillation amplitude data for the transmission line. Each PMU monitors a transmission line for voltage and/or current. In an embodiment, each PMU is monitoring either voltage or current. The PMUs 240 measure all three phases in the transmission and determine phase angle and magnitude values for each phase. The three-phase angle and magnitude (measurements are provided to the damping controller 230.

The $PMU_{north}$ 240A from a first location on a transmission line and $PMU_{south}$ 240B from a second location on the transmission line are separated so as to be able to determine the frequency difference (determined from the angle difference) between remote locations on the grid. This frequency difference signal becomes a "proxy" for the generator speed differences between north and south generation units.

The damping controller 230 includes a real-time control platform or module 232 and a supervisor module 234. The real-time control module 232 includes hardware, firmware and software to acquire and record the time instant that PMU data arrives at its data acquisition unit (not shown in FIG. 2). For each PMU measurement (two are depicted in FIG. 2—North and South locations), the data pass through transfer functions H(z) 232A. The transfer functions 232A consist of a low pass filter to remove unwanted noise from the measurement signals plus a derivative operation (based on the Tustin approximation) that converts the phase angle data into frequency data. The South frequency measurement is then subtracted from the North frequency measurement at summation function 23B, This produces a frequency difference signal that serves as the feedback control signal $\Delta f$. This signal passes through the Controller Gain Module 232C. In this exemplary embodiment, the Controller Gain Module (gain module) 232C is a proportional controller having gain K in units of MW/mHz, with a range of $0<=K<=24$ MW/mHz). This gain can be other types of gain functions including an adaptive gain that changes values based on observed grid conditions (the supervisor monitors the grid conditions). In other embodiments, the controller may be, but is not limited to a proportional controller, derivative controller, integral controller, and proportional-integral-derivative controller. The gain module 232C executes instructions to determine a power command. The instructions are algorithms stored on non-transitory storage medium in the real-time control module 232.

The power command is then subject to a saturation limits gate or filter 232D that limits the increase/decrease of the power command. For example, the saturation limits filter 232D may impose a +/−125 MW limit to the feedback control signal $\Delta f$. The saturation limits prevent the possibility of overloading the energy resource. Finally, the real-time control module dispatches the resultant signal from the saturation limiter, which is the desired power adjustment signal $P_{command}$ that is sent to the energy resource.

The supervisor module 234 includes an asynchronous control platform or module 236, a real-time supervisor 237 and a watchdog circuit module 238. The asynchronous control module 234 includes hardware, firmware and software that provides slower than real-time functions (in the range of seconds to minutes) that inform the controller as to the current damping levels in the grid (in % damping), the gain and phase margins of the grid (there are the stability limits obtained from a Bode plot), and whether or not any disturbances in the grid at similar frequency ranges as an inter-area oscillation (between 0.1 and 0.8 Hz) might interfere with the controller action.

The real-time supervisor 237 performs PMU data quality and delay threshold determination functions and determines if a different PMU should be used or if a PMU should not be used. The real-time supervisor 237 receives a reference time $t_{ref}$ that allows the control system to determine the delays between the time the PMU measurements were taken and the time they arrived at the controller—if too long (greater than some threshold, typically 100 ins or so) then the data is not used.

The watchdog circuit 238 includes hardware including electric circuit components including an emergency stop button and a heartbeat signal to monitor the controller hardware status and the current status. The heartbeat signal monitors the state of health of the controller hardware. If any of the hardware components fails to send a heartbeat signal to the watchdog monitor then the watchdog monitor disarms the controller. The watchdog circuit 238 receives the power adjustment signal from the real-time control module 232 and decides whether to pass through the power adjustment signal or zero it out depending on what it is monitoring/detecting, such as, but not limited to controller hardware malfunctions or an operator 245 initiating the emergency stop button. If no error is detected or an emergency stop is not initiated by the operator 245, the watchdog circuit 238 outputs a power command to a power resource. The power command is a modulation signal or a commanded setpoint value. The operator 245 may be linked to a grid operator (not shown).

The power resource 220 is a power generator, provider and/or load as discussed above. The power resource is either part of the power system 210 to electrically tie to the power system 210. The power resource 220 is initially operating at a power setpoint as provided by an operator of the power system. The power resource 220 receives the power command and either injects into or removes power from the transmission grid at some point in the oscillation.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:
1. A damping controller system, comprising:
 a damping controller that comprises a real-time control module that receives two or more phasor measurements from two or more corresponding locations on an AC transmission line in an electrical grid; and a control gain module that amplifies a power command to a value that is appropriate to be injected into the electrical grid at a location where an energy resource is tied to the electrical grid;
 wherein the real-time control module comprises a summation function that compares the two or more phasor measurements to construct a frequency difference signal that serves as feedback information to the real-time control module; and
 wherein the damping controller further comprises a watchdog circuit that generates the power command to the energy resource connected to the electrical grid in response to the two or more phasor measurements.
2. The controller of claim 1, further comprising:
 an asynchronous control platform that monitors the electrical grid for a behavior that would warrant the controller to be disarmed from issuing the power command due to possible conflicts with the behavior.
3. The controller of claim 1, wherein the behavior is a transient event.
4. The controller of claim 1, wherein the damping controller further comprises a real-time supervisor that receives a reference time that is used to time-synchronize the two or more phasor measurements obtained from multiple locations to a common reference value.

5. The controller of claim 1, wherein the power command comprises a power increase or power decrease command to one or more power generators on the electrical grid.

6. The controller of claim 1, further comprising:
a watchdog circuit that monitors hardware of the real time controller using a heartbeat signal to ensure that the hardware is functioning properly.

7. The controller of claim 1, further comprising:
two or more phasor measurement units that provide the corresponding two or more phase angle measurements.

8. A method of damping oscillations in an electrical grid, comprising:
taking two or more phase angle measurements at two or more corresponding locations on an AC transmission line in the electrical grid;
determining a power command from the two or more phase angle measurements, the power command sent by a real-time feedback control module;
sending the power command to an energy resource;
adjusting power to or from the energy resource and the electrical grid in response to the power command; and
wherein a supervisor module will not use the power command sent by a real-time feedback control module due to information obtained from a watchdog circuit or an asynchronous control platform or a real-time supervisor or operator indicating that grid conditions exist that warrant not using an output from the real-time feedback control module pending further notice from the supervisor module.

9. The method of claim 8, further comprising:
wherein the two or more phase angle measurements comprise two or more corresponding time stamps and comparing the two or more corresponding time stamps to ensure that the two or more phase angle measurements used in the real-time feedback control module are time-aligned to the same time instant.

10. The method of claim 8, wherein the power command is selected from a group consisting of a power increase and power decrease command.

11. The method of claim 8, wherein the energy resource is selected from a group consisting of a power generator, a power load and a DC to AC power facility.

12. A damping controller, comprising:
a real-time control module that receives two or more phasor measurements from two or more corresponding locations on an AC transmission line in an electrical grid; and
an asynchronous control platform that monitors the electrical grid for a behavior, that would warrant the damping controller to be disarmed from issuing a power command due to possible conflicts with the behavior;
wherein the damping controller compares the two or more phasor measurements to construct a difference signal that serves as feedback information to the damping controller; and
wherein the real-time control module generates a power command that is sent to a supervisor module that is then sent to an energy resource connected to the electrical grid provided that the supervisor module does not disarm the real-time control module.

13. A controller, comprising:
a real-time control module that receives two or more phasor measurements from two or more corresponding locations on an AC transmission line in an electrical grid; and
a watchdog circuit that monitors hardware of the real-time control module using a heartbeat signal to ensure that the hardware is functioning properly;
wherein the real-time control module compares the two or more phasor measurements to construct a difference signal that serves as feedback information to the real-time control module; and
wherein the real-time control module generates a power command to an energy resource connected to the electrical grid in response to the two or more phasor measurements.

\* \* \* \* \*